United States Patent [19]
Stokes

[11] 4,456,846

[45] Jun. 26, 1984

[54] COMMUTATOR ASSEMBLY

[75] Inventor: Vijay K. Stokes, Schenectady, N.Y.

[73] Assignee: General Electric Company, Schenectady, N.Y.

[21] Appl. No.: 454,129

[22] Filed: Dec. 29, 1982

[51] Int. Cl.$^3$ .............................................. H02K 13/00

[52] U.S. Cl. .................................... 310/233; 310/235; 29/597; 264/272.20

[58] Field of Search ............... 310/233, 234, 235, 236, 310/237, 219, 232, 42, 43, 128, 135, 136, 231; 29/597; 307/7; 264/272.19, 272.20

[56] References Cited

U.S. PATENT DOCUMENTS

| | | | |
|---|---|---|---|
| 2,492,657 | 12/1949 | Sauer | 310/236 |
| 2,602,988 | 7/1952 | Klym | 29/190 |
| 2,963,774 | 12/1960 | Pike | 310/235 |
| 3,864,821 | 2/1975 | Ito et al. | 29/597 |
| 3,958,326 | 5/1976 | Matsumoto et al. | 29/597 |
| 3,987,539 | 10/1976 | Gravener | 29/597 |

FOREIGN PATENT DOCUMENTS

| | | | |
|---|---|---|---|
| 1223885 | 6/1960 | France | 310/235 |
| 2504318 | 10/1982 | France | 310/233 |
| 665116 | 1/1952 | United Kingdom | 29/597 |

*Primary Examiner*—R. Skudy
*Attorney, Agent, or Firm*—Robert J. Jarvis; James C. Davis, Jr.; Marvin Snyder

[57] ABSTRACT

The external segments of a commutator for rotating electrical machinery are mechanically interlocked to a molded matrix by a plurality of tang assemblies having protrusions at their ends for engagement deep within the internal matrix, to hold the segments against centrifugal forces. The tang assemblies also have anchoring bars shaped for interlocking engagement with the longitudinal channels located on the inner surfaces of the segments.

3 Claims, 10 Drawing Figures

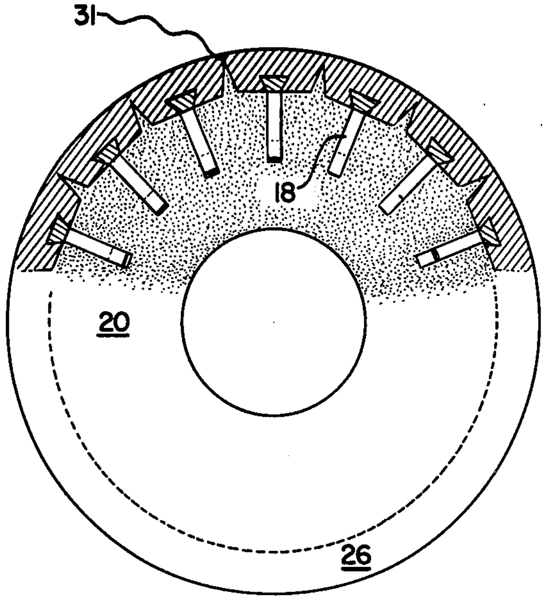
Fig. 6
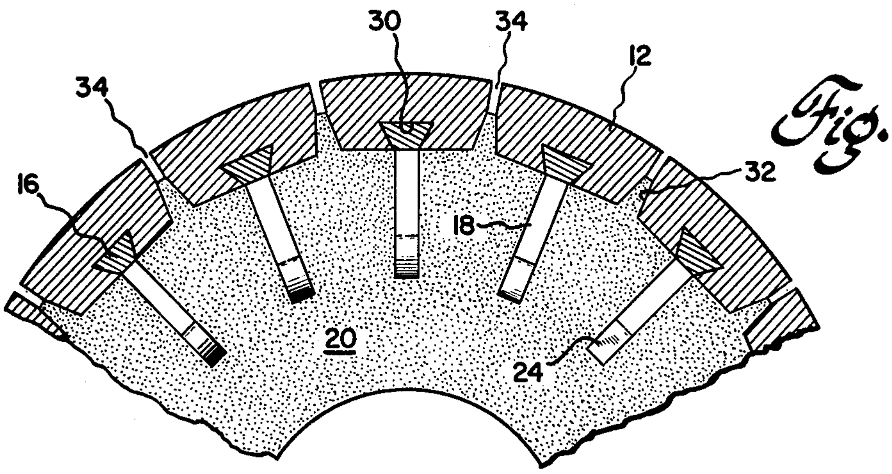
Fig. 7
Fig. 8
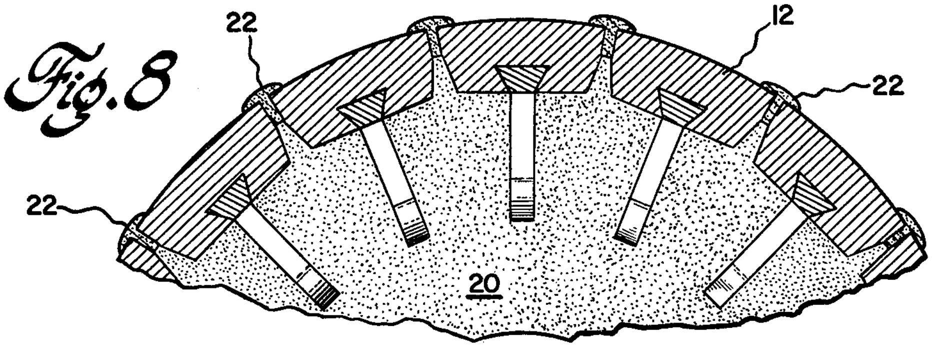

COMMUTATOR ASSEMBLY

FIELD OF THE INVENTION

This invention relates to molded commutators for rotating electrical machinery and, more particularly, to a molded commutator having improved means for anchoring its segments and to a method for fabricating such commutators.

BACKGROUND OF THE INVENTION

Conventional commutators are comprised of a plurality of contact segments arranged in the overall shape of a cylinder, each segment separated by a gap usually filled with an insulator. Commutators in high-speed motors and generators are subjected to very considerable centrifugal forces during use. This is particularly true with large commutators since the instantaneous linear velocity of their segments at a given rotational rate is relatively higher than that experienced by the segments in smaller commutators. To prevent the loosening and loss of commutator segments due to rotation in molded commutators, it is known to provide claws or similar protuberances on their interior surfaces to improve their mechanical locking with the molded matrix. While this proves to be quite satisfactory in smaller commutators, it is less effective in relatively larger ones. For the latter class of commutators, a more effective means for anchoring is required.

It is an object of the present invention to provide a new and improved commutator structure, as well as a method for fabricating it, which provides an effective anchoring means suitable for large commutators.

It is a further object of the present invention to provide a commutator structure, as well as a method for fabricating it, which permits the use of relatively large tangs or anchoring devices which occur more deeply in the matrix and are more distributed than those found in commutators of conventional design.

It is another object of the present invention to provide a commutator structure, as well as a method for fabricating it, which uses relatively large tangs or other anchoring devices without having to form them in the material of the segments themselves as is presently done with many commutators.

SUMMARY OF THE INVENTION

In one aspect of the present invention, a commutator for rotating electrical machinery comprises a plurality of conductive segments having inner and outer surfaces. The segments are circumferentially arranged in a spaced-apart relationship about an axis so that their outer surfaces form an overall structure of cylindrical shape as the outer surface of the commutator. Each of the segments has a longitudinal channel therein opening on its inner surface for receiving a tang assembly. Each tang assembly has an anchoring bar shaped for interlocking engagement with one of the longitudinal segment channels and each bar has a plurality of tangs depending therefrom toward the axis. A non-conducting matrix is molded within the cylindrical structure around the tangs and between the segments.

In another aspect of the present invention a method of making a molded commutator for rotating electrical machinery is set forth in which a tube of conductive material is formed having a plurality of internal longitudinal dividing channels of predetermined depth arranged in a spaced apart relationship around the inside of the tube. The distance between successive channels defines the circumferential width of the intended segments and at least one internal longitudinal groove is provided for each intended segment.

An internal anchoring device is inserted into each groove. Matrix material is then molded within the tube so as to fill the channels and surround each anchoring device. Slots are provided in the outer surface of the tube at locations opposite each channel to a depth sufficient to meet each channel.

BRIEF DESCRIPTION OF THE DRAWINGS

While the invention concludes with claims particularly pointing out and distinctly claiming the present invention, the objects and the advantages can be more readily ascertained from the following description of preferred embodiments when used in conjunction with the accompanying drawings in which:

FIGS. 4–8 are sequential illustrations of the steps followed in the method of this invention wherein FIG. 4 is a cross-section view of a blank tube in a configuration suitable for fabrication of the invention, FIG. 5 shows the tube having the tang assemblies inserted therein, FIG. 6 shows the tube with the tang assemblies and matrix in place, FIG. 7 is a fragmentary cross-sectional view of the invention after slots have been cut therein to form the individual segments, and FIG. 8 is a fragmentary cross-sectional view like that of FIG. 7 after application of an insulating paste;

DETAILED DESCRIPTION OF THE INVENTION

Figure 1:
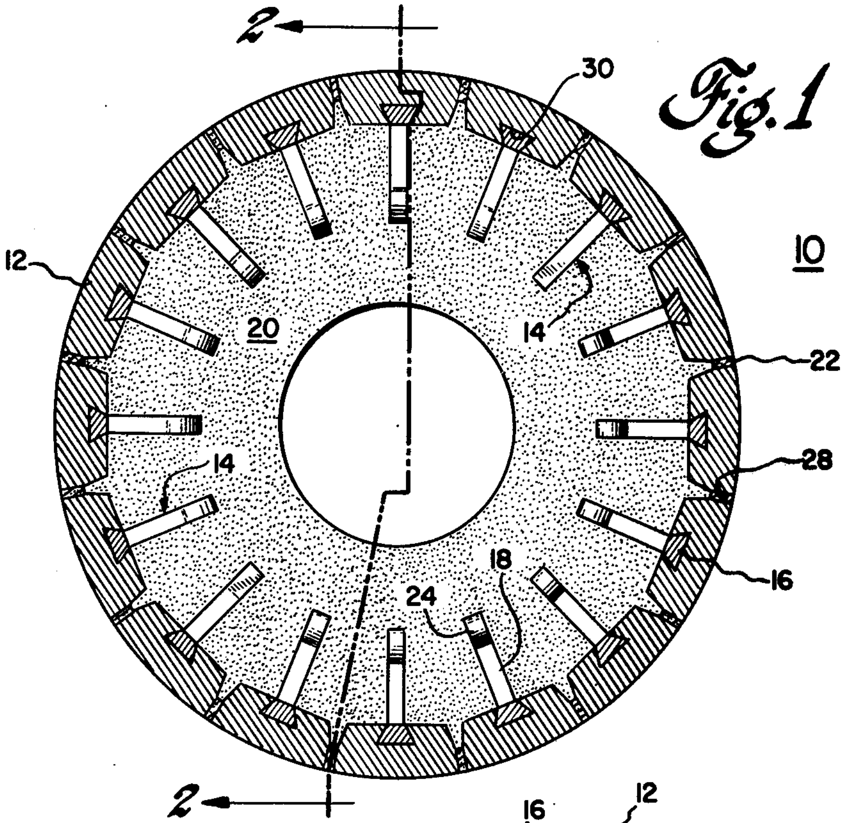
FIG. 1 is a cross-sectional view of a molded commutator fabricated in accordance with the invention.
Figure 2:
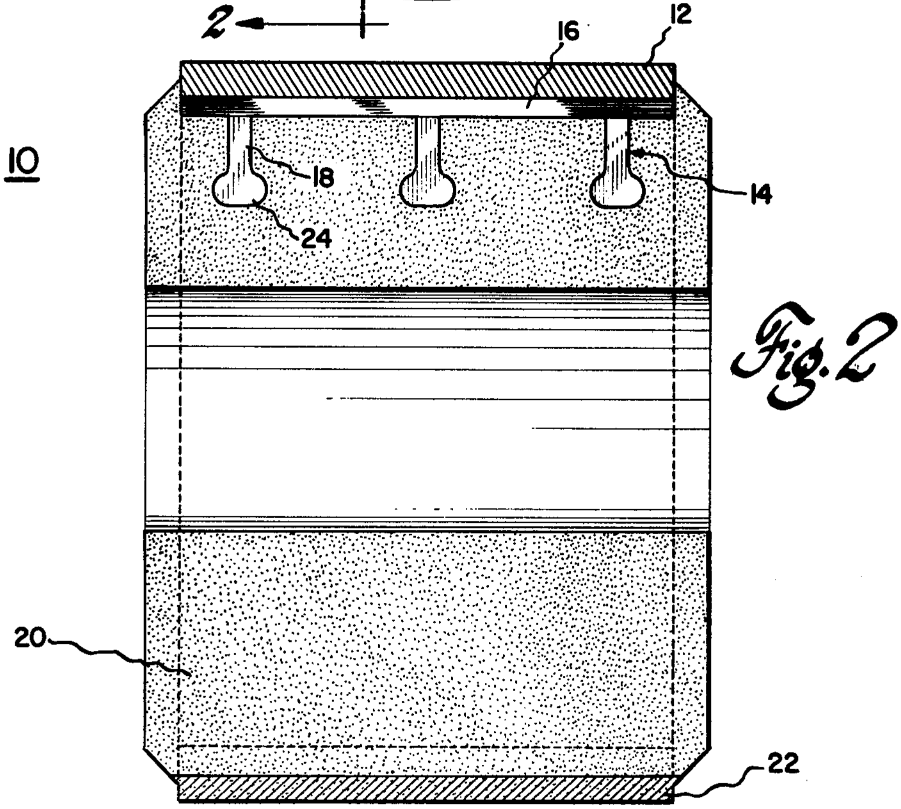
FIG. 2 is a longitudinal section view of the commutator taken on line 2—2 of FIG. 1.

FIGS. 1 and 2 show the commutator of this invention as having the usual cylindrical shape. The outer surface comprises a plurality of segments 12 formed from a ring, but separated from one another by relatively narrow gaps 28. The interior of the commutator is filled with a molded matrix material 20 such as a plastic having sufficient mechanical strength and high dielectric properites at high operating temperatures (typically 200° C.) Each segment 12 has a wedge-shaped longitudinal anchoring groove 30. For the sake of simplicity, electrical leads or connectors are not shown, but it should be understood that such structures may be provided in a conventional manner with each segment connected to an individual conductor of an armature winding.

Figure 3:
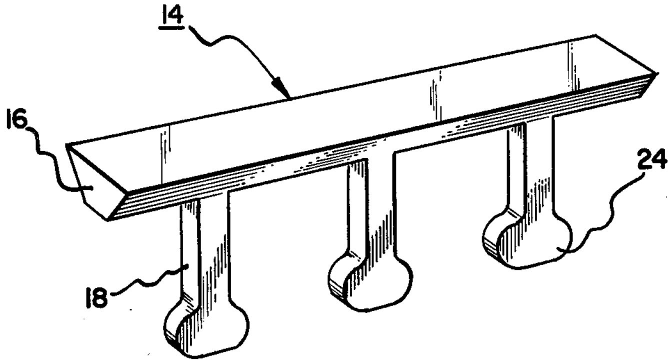
FIG. 3 is a front elevation of a tang assembly used in the invention.

FIG. 3 shows a tang or anchor assembly 14 in a typical configuration for use with this invention. It is comprised, in part, of an anchoring bar 16 having a wedge-shaped cross-section whose shape and dimensions are chosen so that it may be press-fitted into the anchoring groove 30 of a segment 12, illustrated in FIG. 1. A plurality of tangs 18 are attached to anchoring bar 16 on one side. Thus, when tang assembly 14 of FIG. 3 is installed in its associated segment 12, as shown in FIG. 2, its tangs 18 depend from anchoring bar 16 into the interior space of the commutator 10. The protrusions 24, as shown in FIG. 3, help to anchor the tang assembly 14 and thus, the associated segment 12, into the matrix 20 of the commutator, as shown in FIG. 2. This arrangement is effective to secure the segments 12 against becoming loosened due to centrifugal forces when the commutator is in use. Tang assemblies 4 may be made of any suitable material having the desired strength for this application such as mild steel, for example.

Figure 4:
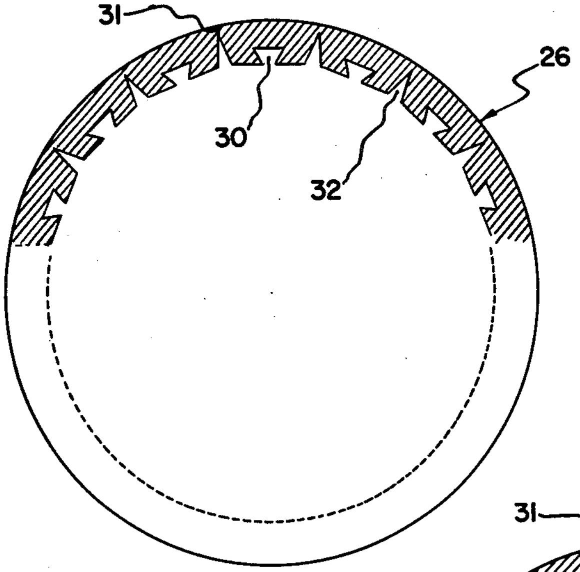
Figure 9:
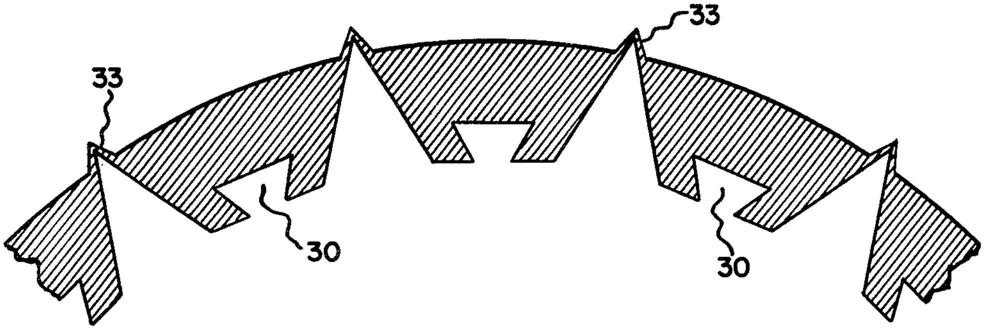
FIG. 9 is a cross sectional view of a blank tube in another configuration suitable for fabrication of the invention.

FIGS. 4–8 illustrate the sequence of steps followed in practicing the method of this invention. As shown in FIG. 4, the first step is to form a tubular blank 26 with a plurality of anchoring grooves 30 and dividing channels 32, both running longitudinally through the tube 26, and both opening on its interior surface. Tube 26 can be formed by any conventional method. For example, it can be formed by starting with a copper tube having appropriate inside and outside diameters, and machining grooves 30 and channels 32 therein. Alternatively, one could begin with a flat strip of appropriate length, width and thickness, and machine the grooves and channels therein. Such strip could also be fabricated with the desired grooves and channels by an extrusion process. In any event, the strip would then be formed into a tube, as shown in FIG. 4, and spot welded along the resulting longitudinal seam 31. Such a seam would desirably be located on the outer surface directly opposite a dividing channel 32 so that the seam would subsequently be cut when dividing the tube into segments. Another alternative is to form ridges 33 instead of channels 32 in tube 26 if the desired size, shape and spacing of the segments permit, as illustrated in FIG. 9. The use of ridges is described in my copending application Ser. No. 334,351, entitled "Method of Manufacturing Molded Commutators," filed Dec. 24, 1981, and assigned to the same assignee as the present invention. The above application is hereby incorporated by reference.

Figure 5:
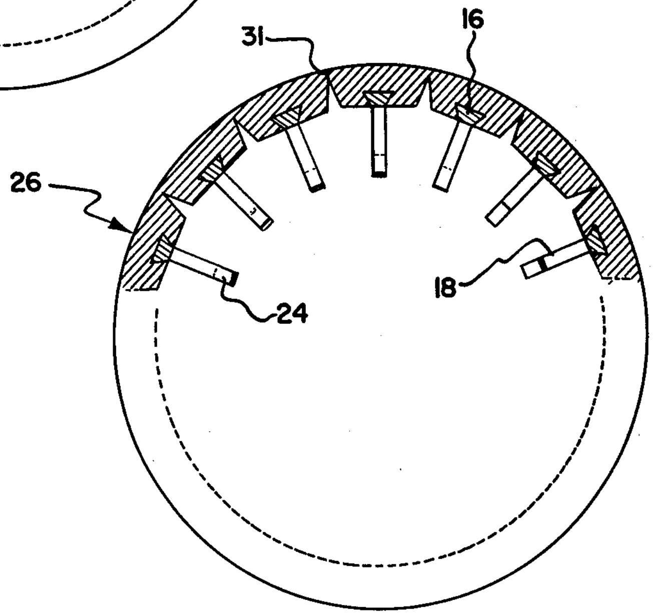

The next step is the insertion of tang assemblies 14 into the interior space of tube 26. This is accomplished by pressing anchoring bars 16 into anchoring grooves 30 so that tangs 18 depend therefrom toward the axis of tube 26. The resulting structure is illustrated in FIG. 5.

Next, a matrix 20 of a suitable material, such as phenolic plastic, is molded within tube 26 in the overall shape of an inner sleeve. For some applications, it may be desirable to preliminarily insert a relatively higher dielectric strength paste (not shown) into dividing channels 32 prior to molding the matrix 20. FIG. 6 shows the resulting configuration.

The final steps in the process are illustrated in FIGS. 7 and 8. Slots 34 are cut into the outside surface of tube 26 at locations opposite dividing channels 32 to a depth sufficient to meet channels 32. This completes the gaps 28 shown in FIG. 1 and the segments 12 are thus formed. An insulating paste 22 may then be installed in each slot 34, as shown in FIG. 8. Finally the outer surface of the structure is machined to yield the commutator in finished form as illustrated in FIG. 1. If the ridges 33 shown in FIG. 9 are used, the cutting step can be eliminated.

Figure 10:
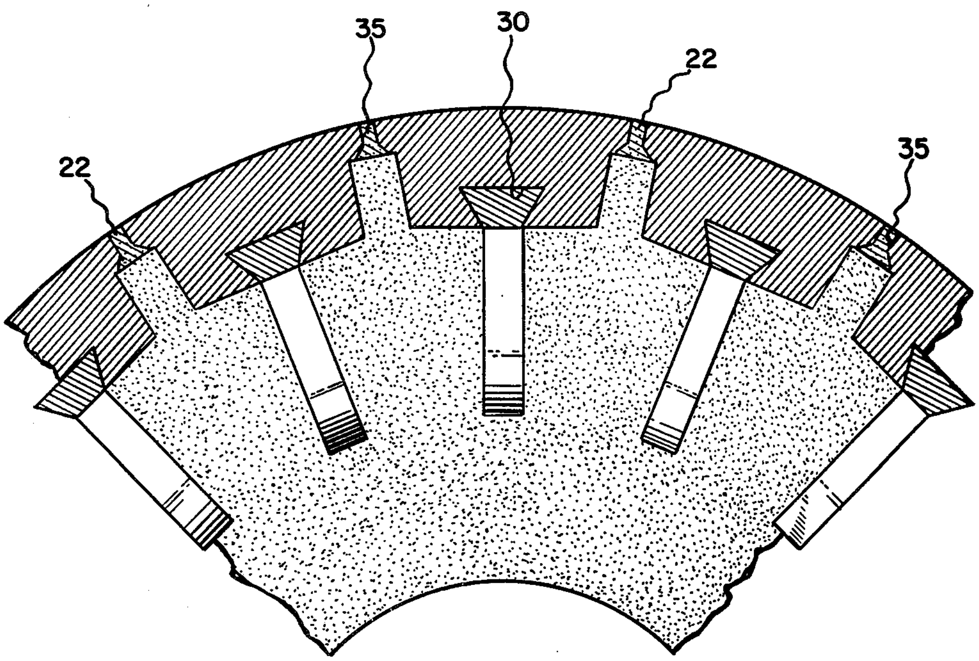
FIG. 10 is a fragmentary cross sectional view of another embodiment of the invention after slots have been cut therein to form the individual segments and the slots have been filled with insulating paste.

An alternative method of forming the separations between the segments would be to use a broaching tool to create a slot 35 having an increasing width toward the interior of the tube as illustrated in FIG. 10. An insulating paste 22 of ground mica in an adhesive, for example, is forced into the slots 35 which on solidification forms a high dielectric strength insulator between segments 12. The shape of the slots 35 anchors the dielectric in position without depending on the bonding between the sides of the slots 35 and the paste material.

The foregoing describes a commutator structure, as well as a method for fabricating it, which provides an effective means of anchoring segments in a matrix suitable for large diameter commutators. The elongated tangs are mechanically locked to each segment and are anchored quite deeply in the matrix. Moreover, relatively large tangs or other anchoring devices can be used without having to form them in the material of the segments.

While the invention has been particularly described with reference to several preferred embodments thereof, it will be understood by those skilled in the art that various changes in form and details may be made therein without departing from the spirit and scope of the invention.

What is claimed is:

1. A commutator for rotating electrical machinery, comprising:

a plurality of conductive segments having inner and outer surfaces, said segments being circumferentially arranged in a spaced-apart relationship about an axis so that their outer surfaces form an overall structure of cylindrical shape as the outer surface of the commutator, each of said segments having a longitudinal channel therein opening on its inner surface;

a tang assembly associated with each of said segments, respectively, each said tang assembly having an anchoring bar shaped for interlocking engagement with one of the longitudinal segment channels, and each said bar having a plurality of tangs depending therefrom toward the axis; and a non-conducting matrix molded within said structure around the tangs and between the segments.

2. The invention of claim 1 wherein each of said tangs, respectively, includes at least one protrusion thereon for improved mechanical engagement with the matrix.

3. The invention of claim 1 wherein the matrix in the spaces between the segments comprises an insulating paste material.

* * * * *